United States Patent Office 3,812,038
Patented May 21, 1974

3,812,038
ELECTROLYTES
Daniel J. Anderson, Indianapolis, Ind., assignor to P. R. Mallory & Co., Inc., Indianapolis, Ind.
No Drawing. Application July 9, 1969, Ser. No. 840,504, now Patent No. 3,670,212, which is a continuation-in-part of abandoned application Ser. No. 648,251, June 23, 1967. Divided and this application Mar. 22, 1971, Ser. No. 127,055
Int. Cl. H01g 9/02
U.S. Cl. 252—62.2                 10 Claims

ABSTRACT OF THE DISCLOSURE

An electrolyte comprising a binary organic system which forms in the correct proportions an azeotropic composition having a boiling point higher than that of either of the system's pure components and a solvent inert to the azeotropic mixture.

---

This is a division of application Ser. No. 840,504, filed July 9, 1969, now U.S. Pat. 3,670,212, which is a continuation-in-part of application Ser. No. 648,251 filed June 23, 1967, now abandoned.

Prior to this invention, existing capacitor electrolytes were for the most part, based on ethylene glycol as a solvent. With this solvent, unless water is added to the electrolyte, the resistance of the electrolyte will be relatively high, and the capacitance of the capacitor made with the electrolyte will fall off sharply at temperatures of about —40° C. or below. If water is added to the electrolyte, the stability of the capacitor on life test is usually adversely affected. In addition, capacitor failures due to the buildup of internal pressures are more likely to occur.

In some previous work that has been done in attempts to solve this problem, glycol ethers have been used as the solvents. Also, work has been done with dimethylformamide, nitriles and other organic solvents. While these solvents will function well in capacitors having good sealing characteristics, their use has proven impractical in many applications where electrolyte vapor pressure is a problem; that is, in applications where diffusions through the casing material and end seals leads to a gradual loss in the quantity of electrolyte remaining in the capacitor.

It is, therefore, an object of the present invention to provide an electrolyte of low volatility for a capacitor which is consistently operable at wide temperature ranges, such as of from about +85° C. to below about —40° C.

It is another object of the invention to provide an electrolyte for a capacitor in which the sealing characteristics are not of the highest quality.

Another object of the invention is to provide a capacitor electrolyte which has good shelf life.

The invention in its broadest aspect contemplates providing an electrolyte from an organic system which forms, in the correct proportions, an azeotropic, or constant-boiling composition, having a boiling point higher than that of any of the system's pure components and a solvent inert to the azeotropic mixture.

It has long been known that constant boiling mixtures are formed with many binary or ternary organic systems. In most cases, the boiling point of the azeotrope is less than that of either pure component. Such a mixture would have a high vapor pressure, thus making the capacitor characteristics readily susceptible to loss of the electrolyte. This type of mixture would, therefore, be of little value in an electrolyte for a capacitor.

In accordance with the present invention, an electrolyte is formed from an organic acidic material, and a basic material, both of which are liquid, and which are so proportioned that the boiling point of the mixture is higher than that of any of the pure components of the system and having a solvent added thereto which is inert to the azeotropic mixture. Preferably the solvent will lower the freezing point. When an organic acidic material and an organic basic material, both of which are liquids, comprise the system, intermolecular attraction results in such an azeotrope. The capacitor in which the electrolyte is used will deteriorate substantially less through the loss of an individual component of the electrolyte. Rather, because of the increased boiling point, the vapor pressure of the mixture is lowered thus causing the electrolyte to be more stable. Any losses of acidic and basic constituents from the electrolyte will be in about the same ratio as found in the electrolyte, hence the electrolyte composition will remain stable, even though the total amount of electrolyte may be gradually diminished.

The acidic materials to be used in the electrolyte of the present invention are liquid organic acidic materials. Most of the acidic materials to be used in accordance with the present invention will have the formula RCOOH wherein R may be hydrogen, alkyl or alkylene, straight or branched chains. Preferably R is H, lower alkyl or lower alkylene with 1 to 6 carbon atoms. Exemplary acids include formic, acetic, propionic, propenoic, butenoic and pentenoic acids. Additionally, non-chloride substitution may take place. For example, trifluoacetic acid may be used.

Another acidic material which may be used is phenol $C_6H_5OH$ and phenol substituted with lower alkyl groups having 1 to 3 atoms.

The basic substances may be generally divided into two groups, those having the formula

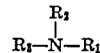

wherein $R_1$, $R_2$, $R_3$ may be hydrogen, alkyl or alkylene, with straight or branched chains. Preferably, $R_1$, $R_2$, and $R_3$ are H, lower alkyl or lower alkylene groups having 1 to 6 carbon atoms. Additionally, non-chloride substitution of the alkyl or alkylene chain may be had. For example, fluoride may be substituted onto the chains.

The second group of basic materials may be classified heterocyclic nitrogen containing compounds. For example, pyridine and substituted pyridine compounds may be utilized. Likewise, pyrroles and substituted pyrroles may be utilized. The substituents on the pyridine and pyrrole type compounds (other item H) are alkylene or alkyl, preferably lower, most preferably having 1 to 4 carbon atoms. Also, the presence of one or more non-chloride substituents would not be disadvantageous. Examples include methyl substituted pyridines including 2-picoline, 3-picoline, 4-picoline, 2-ethyl pyridine, 3-propylpyridine, 4-butyl pyridine. Likewise, methyl, ethyl and propyl groups preferably no more than one may be substituted onto the pyrrole molecules.

Tabulated below in Table I are several examples of organic acidic materials and organic basic materials which may be used which will yield the desired azeotropic mixtures with their boiling points and the boiling points of the mixtures.

TABLE I

| A | B | B.P. of A, °C. | B.P. of B, °C. | B.P. of azeotrope, °C. |
|---|---|---|---|---|
| Acetic acid | Triethylamine | 118 | 90 | 163 |
| Do | Trimethylamine | 118 | 3.5 | 148–150 |
| Do | Pyridine | 118 | 115 | 139–141 |
| Propionic acid | Triethylamine | 141 | 90 | 168 |
| Do | Pyridine | 141 | 115 | 148–150 |
| Phenol | 4-picoline | 182 | 143 | 190 |

In order to achieve the azeotrope with the higher boiling point, the proportion of acid to base should be carefully controlled. Presented in tabular form in Table II, the preferred proportions by weight are as follows:

TABLE II

| A | B | Ratio of A to B |
|---|---|---|
| Acetic acid | Triethylamine | 69:31 |
| Do | Trimethylamine | 80:20 |
| Do | Pyridine | 53:47 |
| Propionic acid | Triethylamine | 73:27 |
| Do | Pyridine | 74:26 |
| Phenol | 4-picoline | 65.5:34.5 |

The proportions of other compounds falling within the acidic and basic substances of the present invention can either be determined from data tabulated in handbooks or simple experiments may be carried out to determine the azeotropic mixture composition and whether or not the boiling point of the azeotropic mixture is higher than the boiling point of the components. It is only in the latter event that the composition is intended to fall within the scope of the present invention.

Although the azeotropic system possesses desirable low temperature characteristics, it has also been found that when the azeotropic electrolyte is combined with selected solvents that are inert to the azeotropic system and have a wide span between the freezing point and the boiling point, the freezing point of the system can be lowered to thus improve the performance of the capacitor. For low volatility and for good low temperature performance, the boiling point of the solvent should usually be at least 100° C. and freezing points usually lower than −55° C.

In general, suitable solvents include ketones, ethers, alcohols, esters, and mixtures thereof.

As the ketones which may be used, in general, will have the formula

wherein $R_4$ and $R_5$ are alkyl or alkylene, straight or branched chains, which may contain non-chloric substituted groups. Preferably $R_4$ and $R_5$ total at least 5 carbon atoms. Generally, they will total 5 to 15 carbon atoms, most preferably 6 to 10 carbon atoms. Exemplary ketones include methyl isoamyl ketone and isobutyl heptyl ketone.

The alcohols which may be used as, or in the solvent are preferably straight or branched chains and have at least 4 carbon atoms and usually not more than 15 carbon atoms, preferably 5 to 10 carbon atoms. Exemplary alcohols include 2-ethyl butanol and normal pentanol.

Ethers also may be utilized as, or in the solvent of the present invention. In general, the ethers should have at least 6 carbon atoms and usually will not have more than 15 carbon atoms. Of course, the ethers must have at least one oxygen, but they may have more than one oxygen. Examples include ethylene glycol monomethyl either, diethylene glycol monoethyl, ether, propylene glycol monopropyl ether, and propylene glycol monobutyl ether.

The esters which may be used in the solvent of the present invention should have at least 4 and preferably 5 carbon atoms. As is well known in the art, esters are formed from reaction of an acid with an alcohol. With alcohol having one OH group, monoesters are obtained; with alcohols having 2 or a plurality of OH groups, di and tri esters, for example, are obtained. Preferred esters are the acetates, propionates and butyrates. Exemplary esters include amyl acetate, ethylene glycol monomethyl ether acetate and amyl propionate.

The following Table III lists exemplary solvents that have been found to be acceptable along with their boiling and freezing points.

TABLE III

| Solvent | B.P., ° C. | F.P., ° C. |
|---|---|---|
| Methyl isoamyl ketone | 145 | −74 |
| Isobutyl heptyl ketone | 218 | −75 |
| 2-ethyl butanol | 147 | −114 |
| Ethylene glycol monomethyl ether | 135 | −100 |
| n-Pentanol | 138 | −78 |
| Diethylene glycol monoethyl ether | 194 | −85 |
| Amyl acetate | 146 | −100 |
| Methyl Cellosolve acetate | 145 | −65 |
| Propylene glycol monopropyl ether | 150 | −80 |
| Propylene glycol monobutyl ether | 170 | −80 |

In general, in order to keep the conductivity of the electrolyte within reasonable limits, the volume ratio of the solvent to the azeotrope should preferably be from a minimum of one volume of solvent to three volumes of azeotrope, to a maximum of 5 volumes of solvent to one volume of azeotrope. In applications in which electrolyte conductivity is not a problem, even higher ratios of solvent to azeotrope mixture may be used.

While the present electrolyte has been found to be quite adaptable to operation in a wide temperature range, including for example, about +85° C. and higher to below about −40° C. without major deterioration of the capacitor, it has been found that in order to improve the electrolyte's shelf life (periods when not in use), a minor amount of an inhibitor may be added when the electrolyte is to be used in applications requiring considerable shelf life. To this end, it has been found that, for the above acidic and basic materials, phosphoric or phosphorous acid or soluble (in the electrolyte) organic or inorganic salt such as phosphates, phosphonates, phosphites may be added to improve the shelf life of the electrolyte. Preferably the amount added is based on the amount of azeotrope, from about 0.1% to 1% by weight.

The electrolyte of the present invention can be utilized in a wide range of capacitors. The electrolyte can be used in impregnated type capacitors wherein paper, cellulosic fiber or polymeric separators may be used. The separators are, as is well known, placed between film-forming metal electrodes. While the film-forming metal may be any of the known metals for this purpose including titanium, zirconium, niobium; tantalum and aluminum are preferred. The impregnated capacitor may be of the flat type or of the wound type.

The electrolyte can also be used in the wet type of capacitor. The anode may be made of any of the above-mentioned film-forming metals. The can may be made of a film-forming metal, or another metal such as silver or gold and if desired may be reinforced with another metal, for example steel, including stainless, copper, or copper alloys.

EXAMPLE I

An electrolyte having the following composition was prepared by mixing the constituents in a suitable beaker in liquid form.

| | Grams |
|---|---|
| Glacial acetic acid | 138 |
| Triethylamine | 62 |
| 85% phosphoric acid | 1 |

To this mixture there was added a solvent of methyl isoamyl ketone in a 1:1 volume ratio.

To determine if the azeotropic composition was affected by the addition of the ketone, a sample of the electrolyte was raised in temperature until boiling occurred. No appreciable boiling was noted until the temperature reached 142° C., which is close to the boiling point of the ketone. Further heating caused additional boiling in the 144–146° C. range. After half the ketone had been boiled off, the electrolyte temperature was reduced to 30° C. and the resistance measured. The reading of 280 ohms indicated that the electrolyte composition was again approaching that of the basic azeotrope, and that the proportions of acetic acid to triethylamine were essentially unchanged.

EXAMPLE II

The electrolyte produced in Example I was introduced into a number of 3/8" diameter aluminum case axial lead capacitors of 15/16" length. The end seals of the capacitors were made of molded phenolic material, with a rubber O-ring gasket. The capacitors were rated at 25 mfd. at 30 volts. The capacitors were compared with capacitors using a standard glycol-borate electrolyte. Cold tests were made with the result shown in Table IV. In the Table IV, C is capacitance in microfarads, and R is resistance in ohms.

TABLE IV

| | Glycol borate | | Azeotrope-solvent | |
|---|---|---|---|---|
| | C | R x C | C | R x C |
| Temperature, °C.: | | | | |
| +25 | 25.7 | 62 | 26.0 | 44 |
| −20 | 23.6 | 440 | 24.8 | 88 |
| −30 | 21.2 | 1030 | 24.4 | 130 |
| −40 | 16.2 | 2720 | 23.9 | 270 |
| −55 | 5.0 | 6500 | 22.0 | 730 |

From Table IV, it is readily seen that there is a remarkable improvement over the standard glycol-borate electrolyte in terms of the lower resistivities, especially at the lower temperatures, and the relatively constant value of the capacitance.

EXAMPLE III

Life tests were also run on the capacitors produced in Example II with results being tabulated below in Table V. In the data the following nomenclature is used:

C = capacitance in microfarads
Percent DF = percent dissipation factor
IDC = direct current leakage at rated voltage measured after 3 minutes electrification

TABLE V

A. 85° C. life test

| | Initial | | | 500 hours at 85° C. | | |
|---|---|---|---|---|---|---|
| | Percent of initial C | Percent DF | IDC | Percent of initial C | Percent DF | IDC |
| Glycol-borate | 100 | 4.8 | 0.73 | 98.5 | 5.3 | 0.1 |
| Azeotrope-solvent | 100 | 3.1 | 0.95 | 97.5 | 3.0 | 0.15 |

B. 85° C. shelf life (soak) test

| | | | | | | |
|---|---|---|---|---|---|---|
| Glycol-borate | 100 | 5.6 | 0.90 | 96.9 | 4.7 | 3.8 |
| Azeotrope-solvent | 100 | 3.1 | 0.30 | 95.4 | 2.9 | 3.0 |

From the test data and the foregoing description it is apparent that the present invention provides a novel electrolyte which gives good operating characteristics for capacitors operating in a wide temperature range, for example from about +85° C. to below about −40° C.

As many different embodiments of this invention may be made without departing from the spirit and scope hereof, it is to be understood that the invention is not limited to the specific embodiments hereof, except as defined in the appended claims and in accordance with the doctrine of equivalents.

What is claimed is:

1. An electrolyte for use in a capacitor consisting essentially of a binary organic system having a composition of compounds A and B taken from the class of compounds indicated in the following table, the compounds being in proportion as indicated in said table

| A | B | Wt. ratio of A to B |
|---|---|---|
| Acetic acid | Triethylamine | 69:31 |
| Do | Trimethylamine | 80:20 |
| Do | Pyridine | 53:47 |
| Propionic acid | Triethylamine | 73:27 |
| Do | Pyridine | 74:26 |
| Phenol | 4-picoline | 65.5:34.5 | and a solvent inert to said binary system, said solvent being taken from the class of compounds indicated in the following table and having the boiling and freezing points indicated

| Solvent | B.P.,° C. | F.P.,° C. |
|---|---|---|
| Methyl isoamyl ketone | 145 | −74 |
| Isobutyl heptyl ketone | 218 | −75 |
| 2-ethyl butanol | 147 | −114 |
| Ethylene glycol monomethyl ether | 135 | −100 |
| N-pentanol | 138 | −78 |
| Diethylene glycol monoethyl ether | 194 | −85 |
| Amyl acetate | 146 | −100 |
| Methyl Cellosolve acetate | 145 | −65 |
| Propylene glycol monopropyl ether | 150 | −80 |
| Propylene glycol monobutyl ether | 170 | −80 | the volume ratio of solvent to the binary system is about 1:3 to about 5:1.

2. The electrolyte of claim 1 in which from about 0.1% to about 1% by weight of an acid taken from the class consisting of phosphoric and phosphorous acid based on the weight of said binary system is included.

3. An electrolyte for use in a capacitor consisting essentially of a binary organic system having the composition by weight of about 69 parts glacial acetic acid, about 31 parts triethylamine and about 0.5% phosphoric acid by weight, and methyl-isoamyl-ketone, the volume ratio of the ketone to the binary system is about 1:3 to about 5:1.

4. An electrolyte for use in a capacitor consisting essentially of an azeotropic composition of a liquid organic acidic material having the formula RCOOH where R is H, lower alkyl groups or lower alkylene groups straight or branched chains having 1 to 6 carbon atoms, phenol, phenol substituted with lower alkyl groups having 1 to 3 carbon atoms, or mixtures thereof, and a liquid organic basic material selected from either a heterocyclic nitrogen containing compound or a material having the formula

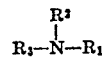

where $R_1$, $R_2$, and $R_3$ are H, lower alkyl groups or lower alkylene groups straight or branched chains having 1 to 6 carbon atoms, or mixtures thereof, and a liquid solvent having a boiling point temperature of about 100° C. or higher and a freezing point temperature of about −55° C. or lower, the solvent selected from ketones, ethers, alcohols, esters, or mixtures thereof, the volume ratio of solvent to azeotropic composition being about 1:3 to about 5:1.

5. The electrolyte of claim 4, wherein the acidic material is selected from the group consisting of formic acid, acetic acid, propionic acid, propenoic acid, butenoic acid, pentenoic acid, trifluoacetic acid and phenol, and wherein the basic material is selected from the group consisting of pyridine and substituted pyridine compounds, pyrroles and substituted pyrroles, triethylamine and trimethylamine.

6. The electrolyte of claim 5, wherein the substituted group on the pyridine and pyrrole type compounds is alkylene or alkyl groups of 1 to 4 carbon atoms.

7. The electrolyte of claim 6, wherein the basic material is a methyl substituted pyridine compound selected from 2-picoline, 3-picoline, 4-picoline, 2-ethyl pyridine, 3-propylpyridine or 4-butyl pyridine.

8. The electrolyte of claim 5, wherein the solvent is selected from the group of ethylene glycol monomethyl ether, diethylene glycol monoethyl ether, propylene glycol monopropyl ether, propylene glycol monobutyl ether, methyl isoamyl ketone, isobutyl heptyl ketone, 2-ethyl butanol, n-pentanol, amyl acetate, ethylene glycol monomethyl ether acetate or amyl propionate.

9. The electrolyte of claim 8, including an inhibitor material of an effective amount up to about 1 wt. percent of the wt. of the azeotropic composition, the inhibitor material selected from the group consisting of phosphinic acid, phosphoric acid, phosphorous acid, or organic or inorganic salts of phosphates, phosphonates and phosphites.

10. The electrolyte of claim 9 wherein the inhibitor material is selected from the group consisting of phosphinic acid, phosphoric acid or phosphorous acid.

References Cited
UNITED STATES PATENTS

| | | | |
|---|---|---|---|
| 2,452,460 | 10/1948 | Hansley | 203—59 |
| 3,539,881 | 11/1970 | Anderson | 252—62.2 X |

OTHER REFERENCES

Van Klooster et al.: "Chemical Abstracts," vol. 39, p. 3480[4] (1945).

Holmberg: "Chemical Abstracts," vol. 55, p. 7967[1] (1961).

Horsley: "Azeotropic Data," American Chemical Society, pp. 167–9, June 1952.

OSCAR R. VERTIZ, Primary Examiner

J. COOPER, Assistant Examiner